US00RE48521E

(19) United States
(12) Reissued Patent
Nishida

(10) Patent Number: US RE48,521 E
(45) Date of Reissued Patent: Apr. 20, 2021

(54) WINDING DEVICE

(71) Applicants: Fuji Seiko Co. Ltd., Gifu (JP); Fuji Shoji Co., Ltd., Gifu (JP)

(72) Inventor: Kihachiro Nishida, Hashima (JP)

(73) Assignees: FUJI SEIKO CO., LTD., Gifu-ken (JP); FUJI SHOJI CO., LTD., Gifu-ken (JP)

(21) Appl. No.: 16/392,545

(22) Filed: Apr. 23, 2019

Related U.S. Patent Documents

Reissue of:
(64) Patent No.: 9,630,370
Issued: Apr. 25, 2017
Appl. No.: 14/409,327
PCT Filed: Jun. 22, 2012
PCT No.: PCT/JP2012/066006
§ 371 (c)(1),
(2) Date: Dec. 18, 2014
PCT Pub. No.: WO2013/190696
PCT Pub. Date: Dec. 27, 2013

(51) Int. Cl.
*B29D 30/48* (2006.01)
*B29D 30/50* (2006.01)
*B21F 37/00* (2006.01)

(52) U.S. Cl.
CPC ..... *B29D 30/50* (2013.01); *B21F 37/00* (2013.01); *B29D 30/48* (2013.01); *B29D 2030/487* (2013.01)

(58) Field of Classification Search
None
See application file for complete search history.

(56) References Cited

U.S. PATENT DOCUMENTS 1,821,161 A * 9/1931 Humphrey ..... B29D 30/48 156/422
2,049,587 A * 8/1936 Lehman ..... B29D 30/48 140/92.2
3,051,221 A * 8/1962 Strozewski ..... B29D 30/48 156/136
6,352,602 B1 3/2002 Ogawa

FOREIGN PATENT DOCUMENTS

| | | |
|---|---|---|
| CN | 2042851 | 8/1989 |
| CN | 2574804 | 9/2003 |
| CN | 101058235 | 10/2007 |
| CN | 200995916 | 12/2007 |
| JP | 3-118630 | 12/1991 |
| JP | 09-267410 | 10/1997 |
| JP | 2000-334858 | 12/2000 |
| JP | 2007-160830 | 6/2007 |
| SU | 1353663 | 11/1987 |
| SU | 1627418 | 2/1991 |

* cited by examiner

*Primary Examiner* — Elizabeth L McKane

(57) ABSTRACT

A winding device is provided that includes a base plate that is rotated by a rotary shaft and segments. With rotation of the base plate, a wire is wound on the outer circumference of the segments, which rotate integrally with the base plate, to form a bead ring. The winding device includes an manipulation shaft that is rotated by a handle, and conversion mechanisms that are provided between the manipulation shaft and each of the segments The conversion mechanisms transmit and convert rotation of the manipulation shaft to movement of each segment in the radial direction of the base plate.

3 Claims, 8 Drawing Sheets

WINDING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is the National Stage of International Application No. PCT/JP2012/066006, filed on Jun. 22, 2012. The content of this application is hereby incorporated by reference in its entirety.

BACKGROUND OF THE INVENTION

The present invention relates to a winding device for forming a bead ring by winding a wire on the outer circumference of a rotational body.

One such winding device has a groove for winding a wire on the outer circumference of a disk-like rotational body. The rotational body is rotated in one direction to wind the wire in a manner stacked in a layer direction in a state aligned in a row direction in the groove, thus forming a bead ring.

PRIOR ART DOCUMENTS

Patent Documents

Patent Document 1: Japanese Laid-Open Patent Publication No. 2000-334858

SUMMARY OF THE INVENTION

Depending on the intended use, there can be a request for bead rings having different winding diameters. However, if a bead ring is formed using a winding device described in Patent Document 1, it is difficult to change the winding diameter of the bead ring by not only a great amount, but also by a slight amount. The aforementioned request is thus difficult to satisfy.

The present invention is focused on this problem of the conventional technique. Accordingly, it is an objective of the invention to provide a winding device capable of easily changing the winding diameter of a bead ring. The winding device ensures easy change of the winding diameter of a bead ring regardless of whether it is changed by a small amount or a great amount.

To achieve the foregoing objective and in accordance with one aspect of the present invention, a winding device is provided that includes a base plate that is rotated by a rotary shaft, a plurality of segments arranged in an annular zone corresponding to an outer circumference of the base plate, a manipulation shaft that is rotated by a handle, and a conversion mechanism. Each of the segments has a shape corresponding to one of the shapes obtained by dividing the annular zone into a plurality of sections along a circumference of the base plate. The segments are each supported by the base plate each in a manner movable in a radial direction of the base plate. The manipulation shaft is rotated by a handle. When the base plate rotates, a wire is wound on an outer circumference of the segments, which rotate integrally with the base plate, thereby forming a bead ring. The conversion mechanism is arranged between the manipulation shaft and each segment. The conversion mechanism converts rotation of the manipulation shaft to movement of the corresponding segment in the radial direction of the base plate.

Accordingly, in the winding device according to the present invention, when the manipulation shaft is rotated by the handle, the conversion mechanisms move the segments in the radial direction of the base plate with the segments arranged along the circumference of the base plate to change the winding diameter of the bead ring. As a result, the winding diameter of the bead ring is changed by a slight amount or a great amount through such simple manipulation, which is rotation of the handle.

In the above described configuration, the conversion mechanism may include a first gear supported by the base plate in a manner rotational relative to the rotary shaft, a second gear fixed to the manipulation shaft to be meshed with the first gear, a plurality of threaded shafts supported by the base plate, a plurality of third gears fixed to the threaded shafts to be meshed with the first gear, and a plurality of movable members that are guided by a plurality of guide portions, which are formed on the base plate to extend in the radial direction of the base plate. Each of the [threaded portions] *moveable members* includes an internal threaded portion threaded onto the corresponding threaded shaft. The segments are each supported by one of the movable members.

In the above described configuration, each of the movable members may include a body that is guided by the corresponding guide portion and a support member supported by the body in a manner movable in the radial direction of the base plate, wherein the support member supports the corresponding segment.

In the above described configuration, each of the segments may include an attachment portion supported by the corresponding support member and a winding portion detachably attached to the attachment portion. A groove for winding the wire is formed in the winding portion.

In the above described configuration, each of the winding portions may be configured such that a width of the groove is changeable.

In the above described configuration, each of the support members may have a plurality of support portions arranged in the radial direction of the base plate. Each of the segments may be supported by one of the support portions.

In the above described configuration, each of the segments may be supported by the corresponding support members such that the position of the segment relative to the support member is adjustable in the radial direction of the base plate, and a spacer is arranged between each segment and the corresponding support member to set the position of the segment in the radial direction of the base plate.

In the above described configuration, the winding device may further include a plurality of link mechanisms each of which supports one of the support members, a plurality of locking mechanisms each of which locks one of the link mechanisms at a lock position, and a plurality of unlocking mechanisms each of which cancels locking by one of the locking mechanisms.

As has been described, according to the present invention, the winding diameter of a bead ring is easily changed. This makes it unnecessary to prepare a plurality of types of rotational bodies having different outline dimensions and replace the rotational bodies in correspondence with a desired winding diameter to form bead rings having different winding diameters.

DETAILED DESCRIPTION OF THE PREFERRED EMBODIMENTS

First Embodiment

A winding device according to a first embodiment of the present invention will now be described with reference to FIGS. 1 to 6.

Figure 1:
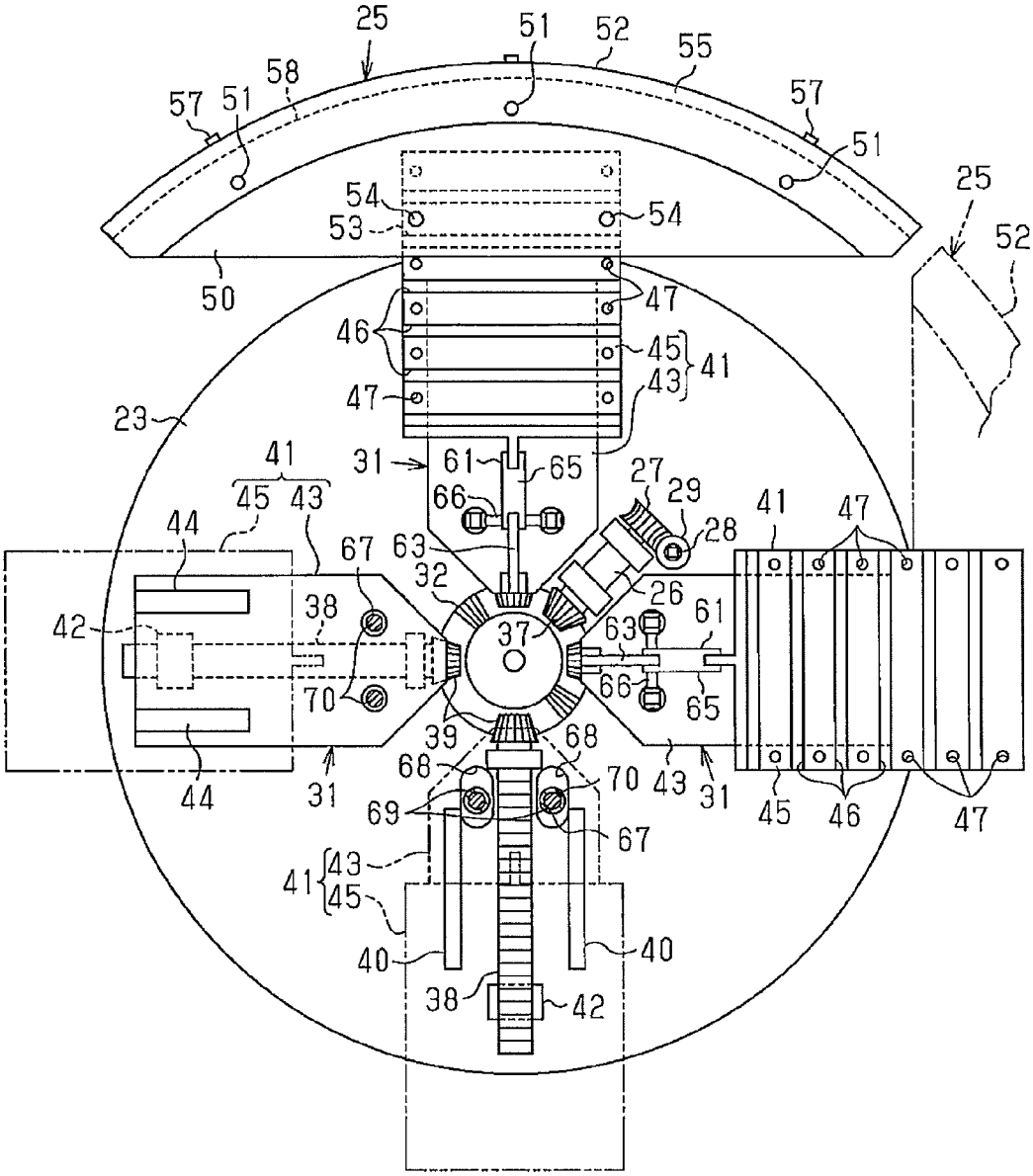
FIG. 1 is a front view showing a portion of a winding device according to a first embodiment.
Figure 2:
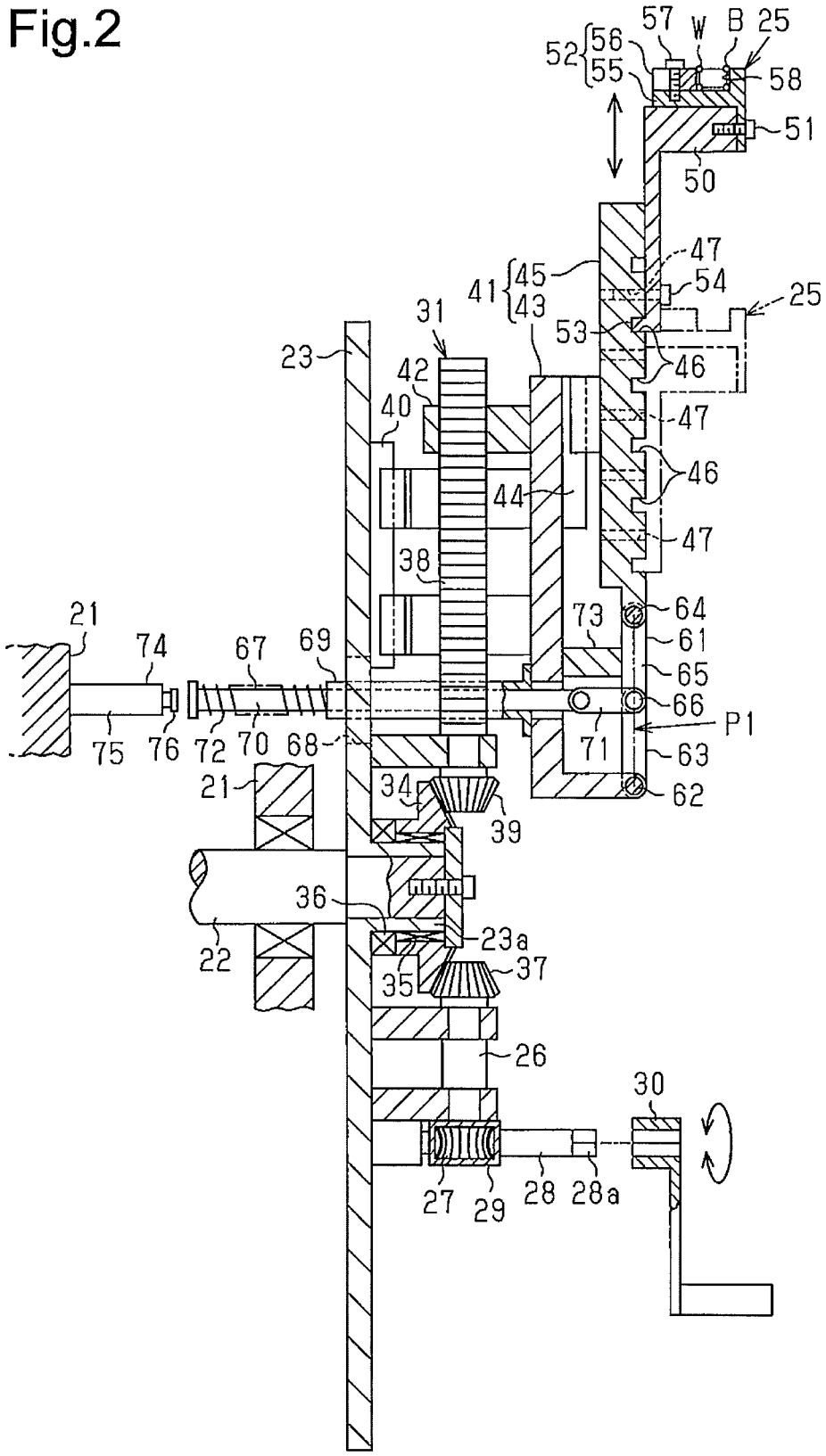
FIG. 2 is an enlarged longitudinal cross-sectional view showing the winding device of the first embodiment.
Figure 3:
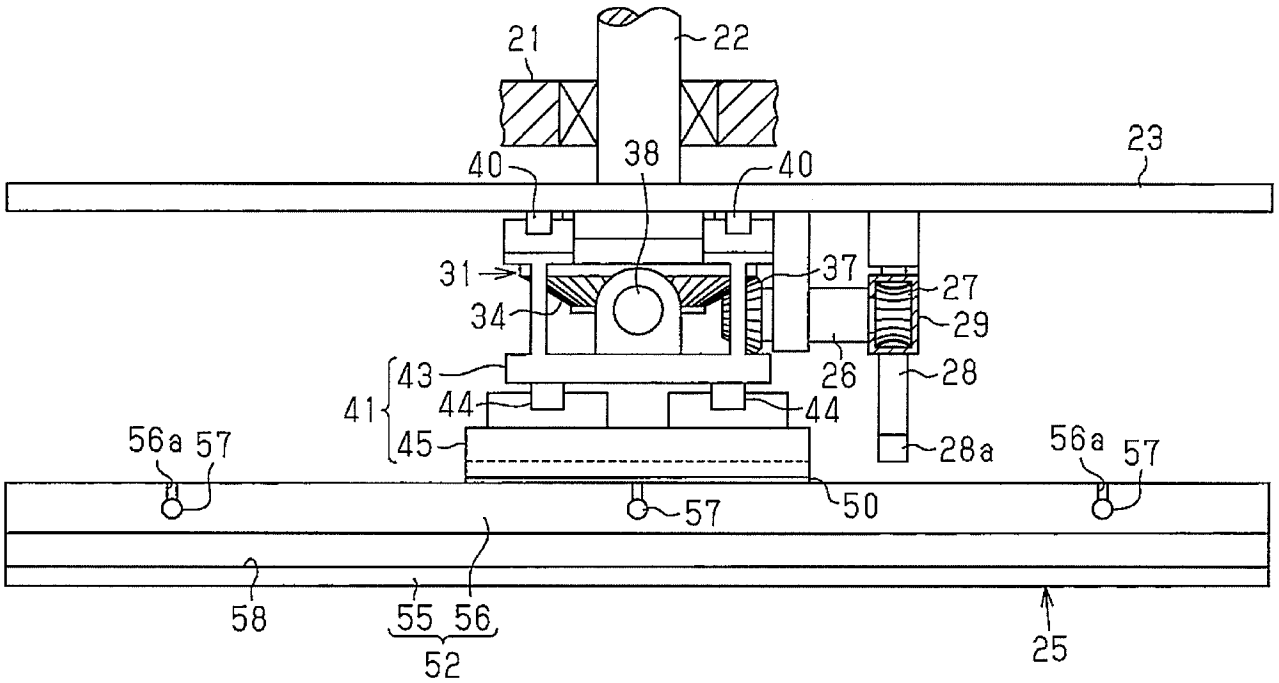
FIG. 3 is an enlarged plan view showing the winding device of the first embodiment.

As shown in FIGS. 1 to 3, a rotary shaft 22 is rotationally supported by a device frame 21 and rotated by a non-illustrated motor. A disk-like base plate 23 is fixed to the distal end of the rotary shaft 22. Segments 25 are arranged in an annular zone (not shown) corresponding to the outer circumference of the base plate 23. The segments 25 each have a shape corresponding to one of the shapes obtained by dividing the annular zone into a plurality of (in the first embodiment, four) sections along the circumference of the base plate. The segments 25 are each supported by the base plate 23 to be movable in a radial direction of the base plate 23 about the rotary shaft 22. When the rotary shaft 22 rotates the base plate 23 in one direction, a wire W is wound on the outer circumference of the segments 25 to form a bead ring B.

A manipulation shaft 26 extending in a radial direction of the base plate 23 is supported by a front surface of the base plate 23 in a manner rotational about the axis of the manipulation shaft 26. A worm wheel 27 is fixed to a first end of the manipulation shaft 26. A handle shaft 28 extending along the axis of the rotary shaft 22 is supported by the front surface of the base plate 23 in the vicinity of the first end of the manipulation shaft 26 in a manner rotational about the axis of the handle shaft 28. A worm 29, which is meshed with the worm wheel 27, is formed in the handle shaft 28. An attachment portion 28a, to which a handle 30 is detachably attached, is formed on the distal end of the handle shaft 28.

A conversion mechanism 31 for converting rotation of the manipulation shaft 26 into radial movement of the segments 25 is arranged between the manipulation shaft 26 and the segment 25. When the handle 30, which is attached to the attachment portion 28a of the handle shaft 28, is manipulated to rotate the handle shaft 28, the manipulation shaft 26 is rotated through the worm 29 and the worm wheel 27. The conversion mechanism 31 moves the segments 25 in the radial direction of the base plate 23 in response to rotation of the manipulation shaft 26.

The configuration of the conversion mechanism 31 will now be described in detail. With reference to FIGS. 1 to 3, a boss portion 23a for fixing the rotary shaft 22 is formed in the front surface of the base plate 23. A first gear 34, which is a bevel gear, is supported by the outer circumference of the boss portion 23a of the base plate 23 in a manner rotational relative to the rotary shaft 22 with a radial bearing 35 and a thrust bearing 36. A second gear 37, which is a bevel gear, is fixed to a second end of the manipulation shaft 26 to be meshed with the first gear 34. A plurality of (in the first embodiment, four) threaded shafts 38, each of which extends in a radial direction of the base plate 23, is supported by the front surface of the base plate 23 at positions corresponding to the segments 25 in a manner rotational about the axis of each threaded shaft 38. A third gear 39, which is a bevel gear meshed with the first gear 34, is fixed to an inner end portion of each threaded shaft 38.

A pair of rail-like guide portions 40, each of which extends in a radial direction of the base plate 23, is provided on the front surface of the base plate 23 at the position corresponding to the threaded shafts 38. A plurality of movable members 41, which supports the segments 25, is movably supported by the corresponding guide portions 40. An internal threaded portion 42, which is threaded onto the corresponding threaded shaft 38, is formed in a back surface of each of the movable members 41 in a manner projecting rearward. When the handle 30 is manipulated to rotate the manipulation shaft 26, the threaded shafts 38 are rotated through the corresponding second gears 37, first gears 34, and third gears 39. Such rotation of the threaded shafts 38 move the movable members 41 together with the segments 25 through the internal threaded portions 42 each in a radial direction of the base plate 23. In this manner, the winding diameter of the bead ring B is changed.

Each of the movable members 41 is configured by a flat body 43, which is guided by the corresponding guide portion 40 on the base plate 23, and a flat support member 45. Each of the support members 45 is supported by the corresponding one of the bodies 43 in a manner movable in a radial direction of the base plate 23 through a pair of rail-like guide portions 44, which is formed in the front surface of the body 43. A plurality of groove-like support portions 46 is formed in a front surface of each support member 45 and spaced apart at predetermined intervals in a radial direction of the base plate 23. A pair of threaded holes 47 is formed in the front surface of the support member 45 at a position between each adjacent pair of the support portions 46 in the vicinities of the opposite sides of the support member 45. As will be described below, each segment 25 is engaged with one of the support portions 46 of the corresponding support member 45 selected to ensure a desired winding diameter and thus supported by the support member 45.

The configuration of each segment 25 will hereafter be described in detail. As illustrated in FIGS. 1 to 3 and 4, each segment 25 is configured by an attachment portion 50, which is supported by the corresponding support member 45, and a winding portion 52, which is detachably attached to the attachment portion 50 with a plurality of screws 51. A projected engagement portion 53, which is engaged selectively with one of the support portions 46 of the support member 45, is formed in the inner peripheral end of the attachment portion 50. When the engagement portion 53 of the attachment portion 50 is selectively engaged with one of the support portions 46 of the support member 45, a pair of screws 54 is threaded into the corresponding threaded holes 47 of the support member 45 from above the attachment portion 50. By removing the screws 54 and engaging the engagement portion 53 with another one of the support portions 46, the position of the segment 25 on the support member 45 is adjusted in a radial direction of the base plate 23.

Figure 4:
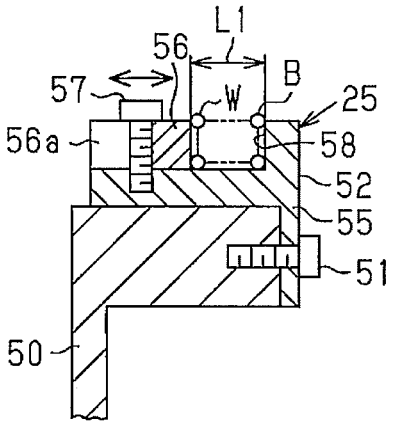
FIG. 4 is an enlarged cross-sectional view showing a winding portion of the winding device of the first embodiment illustrated in FIG. 2.

As illustrated in FIGS. 1 and 2, the winding portion 52 of each segment 25 is configured by a body portion 55, which extends in an arcuate shape as viewed from front, and an adjustment portion 56. Each of the adjustment portions 56 is attached to a radially outer side of the corresponding body portion 55 and has an arcuate shape as viewed from front. Each body portion 55 has a substantially T-shaped cross section with a head portion facing forward. Each adjustment portion 56 includes a plurality of slits 56a, each of which is passed through the adjustment portion 56 and extends in the front-rear direction. The adjustment portion 56 is attached to the body portion 55 with screws 57, which are threaded into corresponding threaded holes of the body portion 55 through the slits 56a. This arrangement allows adjustment of the position of the adjustment portion 56 relative to the body portion 55 in the axial direction of the rotary shaft 22, or, in other words, in the extending direction of each slit 56a. Referring to FIG. 4, a groove 58 for winding the wire W is formed between the body portion 55 and the adjustment portion 56 of the winding portion 52. The groove width L1 of the groove 58 is changed by adjusting the position of the adjustment portion 56 relative to the body portion 55. This changes the winding width of the bead ring B.

Figure 5:
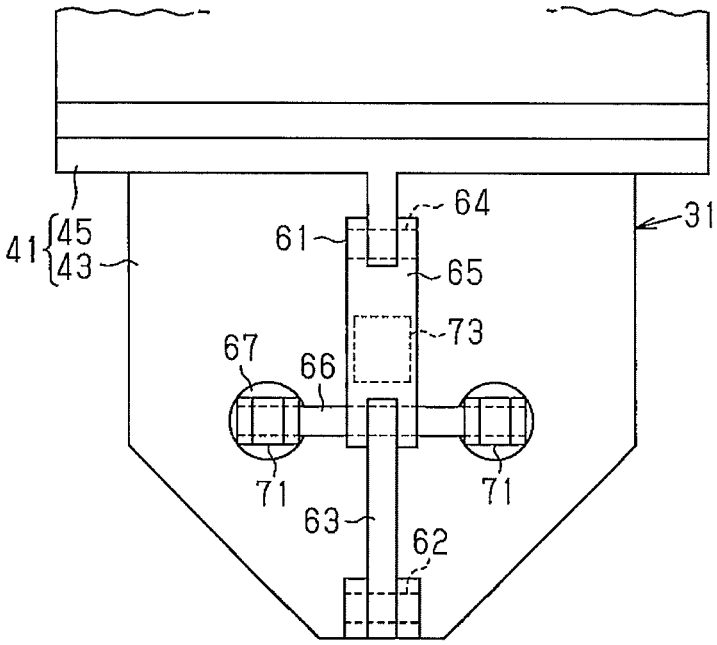
FIG. 5 is an enlarged front view showing a link mechanism of the winding device of the first embodiment.

With reference to FIGS. 1, 2, and 5, a link mechanism 61 for supporting each support member 45, is arranged on the body 43 of the corresponding movable member 41. The link mechanism 61 is configured by a first link 63, a second link 65, and a joint pin 66. The first link 63 is pivotally supported by an inner end portion of the body 43 with a first support pin 62. The second link 65 is pivotally supported by an inner end portion of the support member 45 with a second support pin 64. The joint pin 66 pivotally joins the first link 63 and the second link 65 together.

Figure 6:
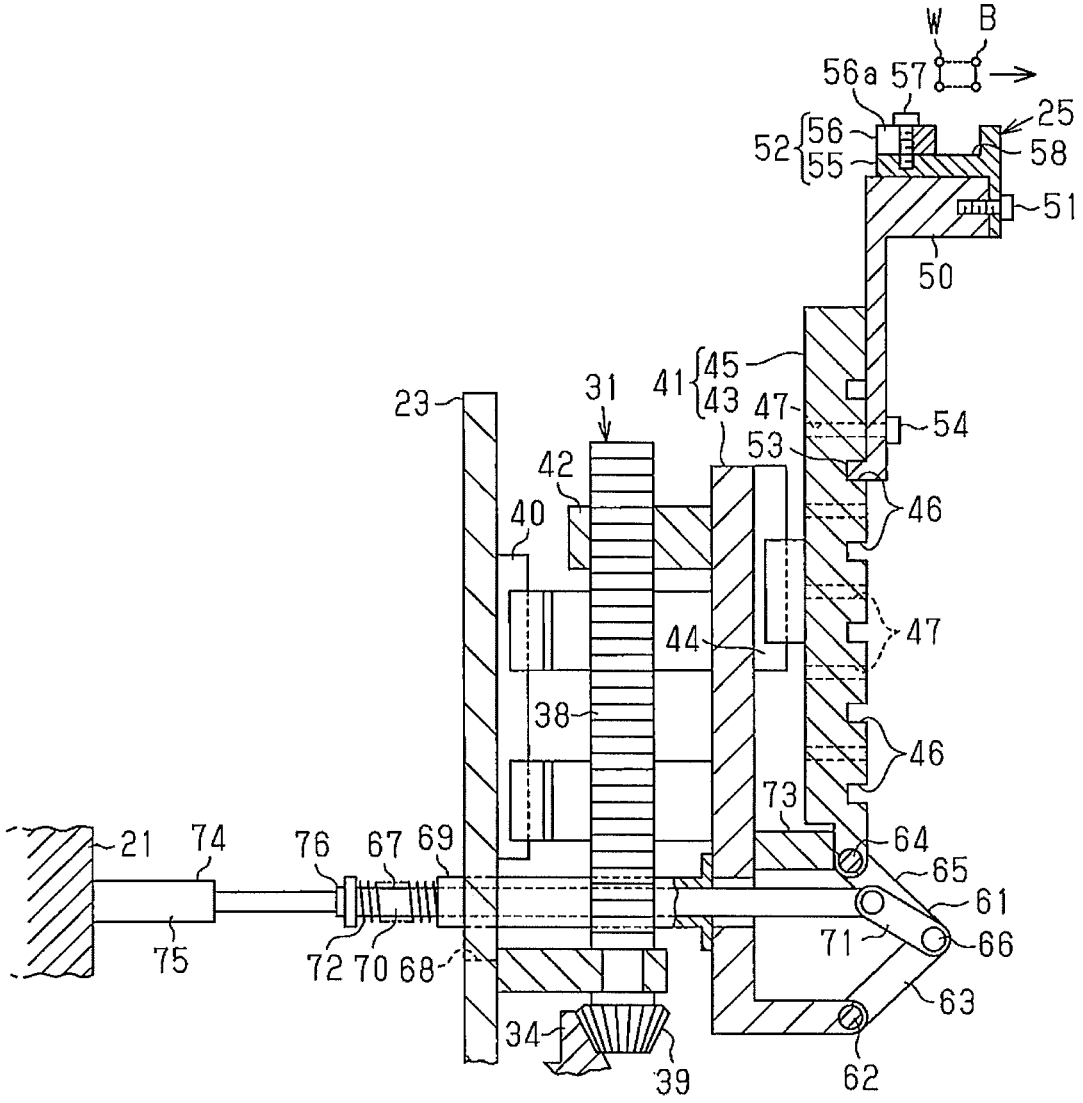
FIG. 6 is a cross-sectional view showing a portion of the winding device of FIG. 2 in an operating state.
Figure 7:
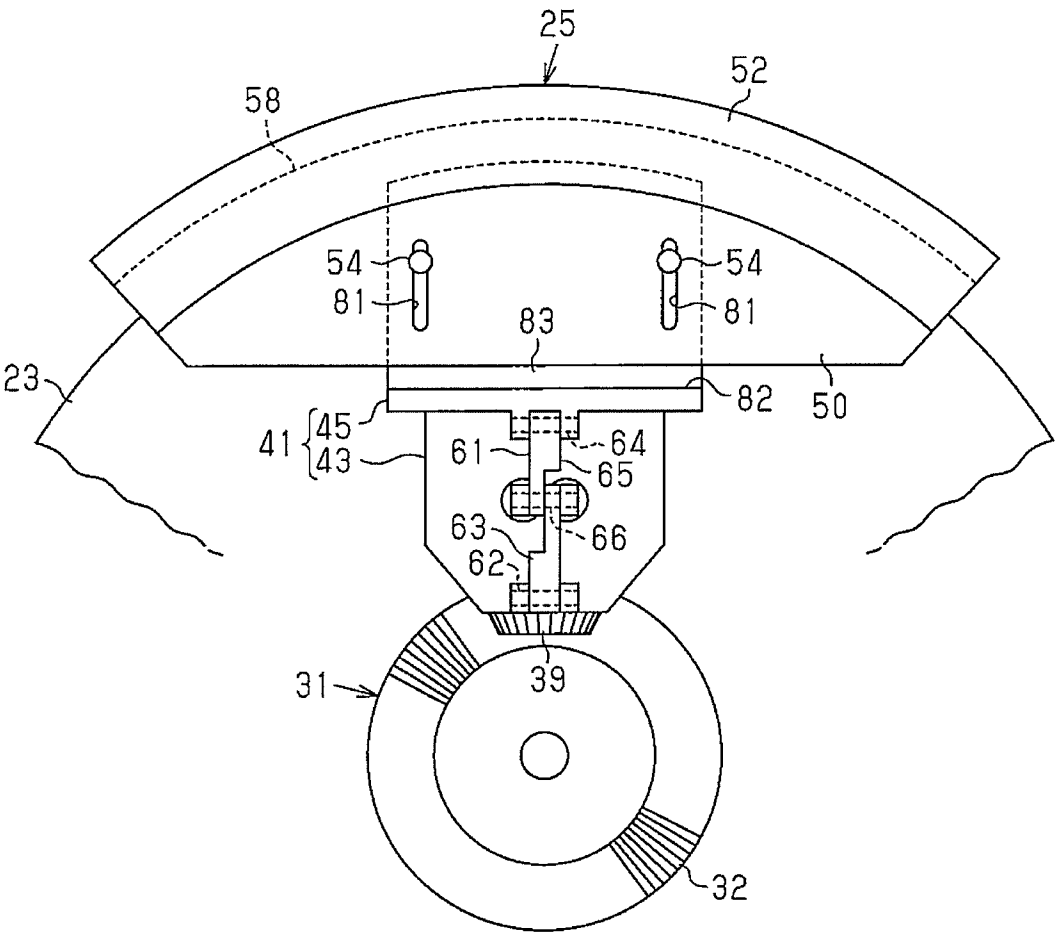
FIG. 7 is a front view showing a portion of a winging device according to a second embodiment.

As illustrated in FIGS. 1, 2, and 6, a locking mechanism 67 for locking each link mechanism 61 at a lock position P1 is arranged in the body 43 of the corresponding movable member 41. The base plate 23 has a plurality of elongated holes 68 extending on opposite sides of the threaded shaft 38. The elongated holes 68 are formed to extend through the base plate 23. Each of the locking mechanisms 67 includes a pair of support tubes 69 and a pair of rods 70. The support tubes 69 are passed through the two corresponding elongated holes 68 on opposite sides of the corresponding threaded shaft 38 and extended in the axial direction of the rotary shaft 22. Each of the support tubes 69 has a front end fixed to the body 43. The rods 70 are inserted through the corresponding support tubes 69 each in a movable manner. Each locking mechanism 67 further includes a pair of lock levers 71 and a pair of springs 72. The lock levers 71 operably connect the front ends of the rods 70 to the end portions of the joint pin 66 of the link mechanism 61. Each of the springs 72 is arranged between the rear end of the corresponding support tube 69 and the rear end of the corresponding rod 70. A stopper 73, which restricts rearward movement of the second link 65 of each link mechanism 61, is formed on the body 43 of one of the movable members 41 in a manner projecting forward.

In a normal state, with reference to FIGS. 1 and 2, the springs 72 urge the joint pin 66 of the corresponding link mechanism 61 toward the base plate 23 through the rod 70 and the lock lever 71. In this manner, the first link 63 and the second link 65 of the link mechanism 61 are urged to pivot toward the base plate 23 about the first and second support pins 62, 64. The stopper 73 is engaged with the second link 65 to restrict rearward movement of the second link 65 at a position where the axis of the joint pin 66 is located slightly rearward of a dead point, which is arranged on the line connecting the axis of the first support pin 62 to the axis of the second support pin 64. Hereinafter, this position will be referred to as the lock position P1. When arranged at the lock position P1, the first link 63 and the second link 65 of the link mechanism 61 are locked in a state prohibited from pivoting. This prevents the axis of the joint pin 66 from moving rearward of the lock position P1, thus preventing the support member 45 of the movable member 41, which supports the segment 25, from moving radially inward.

As illustrated in FIGS. 2 and 6, unlocking mechanisms 74, each of which unlocks the corresponding link mechanism 61 by the locking mechanism 67, are arranged in the device frame 21. Each of the unlocking mechanisms 74 is configured by a cylinder 75 in which a piston rod is accommodated. A pushing portion 76, which is engageable with the rear end of the rod 70 of the corresponding locking mechanism 67, is formed in the front end of the piston rod of the cylinder 75.

After winding of the wire W in the grooves 58 formed in the outer circumference of the segments 25 is ended, or, in other words, when the bead ring B is fully formed, the base plate 23 is stopped at a predetermined position. At this stage, the rear ends of the rods 70 of the locking mechanisms 67 are arranged to correspond to the pushing portions 76 of the unlocking mechanisms 74. In this state, the cylinders 75 are operated to project the piston rods so that, referring to FIG. 6, the rods 70 are pushed forward by the pushing portions 76. In this manner, the rods 70 move the joint pins 66 of the link mechanisms 61 away from the base plate 23 through the lock levers 71, thus spacing the joint pins 66 from the lock positions P1. This unlocks the first links 63 and the second links 65 of the link mechanisms 61 from a locked state such that the support members 45 of the movable members 41, which support the segments 25, move radially inward. The bead ring B is thus separated from the grooves 58.

Operation of the winding device configured as described above will now be described.

In the state shown in FIGS. 1 and 2, each locking mechanism 67 locks the first link 63 and the second link 65 of the corresponding link mechanism 61 at the lock position P1. The support member 45 of each movable member 41, which supports the corresponding segment 25, is thus retained not to move radially inward. In this state, as the rotary shaft 22 rotates the base plate 23 in one direction, the wire W is wound in the grooves 58, which are formed in the outer circumference of the corresponding segments 25, in a manner stacked in a layer direction in a state aligned in a row direction. As a result, the bead ring B is formed.

When the base plate 23 is stopped at the predetermined position after the bead ring B is fully formed, the rear ends of the rods 70 of the locking mechanisms 67 are arranged to correspond to the pushing portions 76 of the unlocking mechanisms 74. In this state, the piston rods of the cylinders 75 of the unlocking mechanisms 74 are projected, thus unlocking the first links 63 and the second links 65 of the link mechanisms 61 from the locked states at the lock positions P1, as illustrated in FIG. 6. This moves the support members 45 of the movable members 41, which support the segments 25, radially inward, thus separating the bead ring B from the grooves 58. In this manner, the bead ring B is easily removed from the segments 25.

To adjust the winding diameter of the bead ring B, which is formed on the segments 25, the handle 30 is attached to the attachment portion 28a of the handle shaft 28. The handle 30 is then manipulated to rotate the handle shaft 28. This rotates the manipulation shaft 26 through the worm 29 and the worm wheel 27, thus moving the movable members 41 supporting the segments 25 in the radial direction of the base plate 23 through the conversion mechanisms 31 through rotation of the manipulation shaft 26. In this manner, the segments 25 are radially moved to change the winding diameter of the bead ring B, which is formed in the grooves 58 in the outer circumference of the segments 25. Accordingly, even if it is desired that the winding diameter be adjusted by a slight amount, the winding diameter of the bead ring B is adjusted accurately by a necessary amount in correspondence with the manipulation amount of the handle 30.

If the winding diameter of the bead ring B, which is formed on the segments 25, must be changed by a great amount, adjustment by means of the handle 30 is not performed and the positions of the segments 25 relative to the support members 45 are changed as represented by the dashed lines in FIG. 2. The positions of the segments 25 relative to the support members 45 are changed by engaging the segments 25 with the other support portions 46 of the support members 45. The positions of the segments 25, which are arranged along the circumference of the base plate 23, are thus changed in the radial direction of the base plate 23. In this manner, the winding diameter of the bead ring B is changed discretely.

When the winding width of the bead ring B formed on the segments 25 must be changed, the position of the adjustment portion 56 of the winding portion 52 of each segment 25 is adjusted as illustrated in FIG. 4. The screws 57 are loosened and, in this state, the adjustment portion 56 is moved rearward or forward in the axial direction of the rotary shaft 22 relative to the body portion 55. This increases or decreases the groove width L1 of the groove 58, which is formed between the body portion 55 and the adjustment portion 56. As a result, the winding width of the bead ring B is changed.

Also, when the cross-sectional shape of the bead ring B formed on the segments 25 must be changed, the winding portion 52 is removed from the attachment portion 50 of each segment 25 and replaced by a winding portion 52 that is configured to form a desired bead ring B. In this manner, as will be described below in a second embodiment, the cross-sectional shape of the bead ring B can be changed to a hexagonal shape.

The first embodiment has the following advantages.

(1) In the winding device of the first embodiment, the multiple segments 25 are arranged along the circumference of the base plate 23, which is rotated by the rotary shaft 22. Each of the segments 25 is supported by the base plate 23 in a manner movable in a radial direction of the base plate 23 about the rotary shaft 22. Each segment 25 has a shape corresponding to one of the shapes obtained by dividing an annular body extending along the circumference of the base plate 23 into a plurality of sections. The wire W is wound on the outer circumference of the segments 25 to form the bead ring B. Each conversion mechanism 31 is provided between the manipulation shaft 26, which is rotated through the handle 30, and the corresponding segment 25. The conversion mechanism 31 is configured to convert rotation of the manipulation shaft 26 into radial movement of the segment 25.

Accordingly, as the manipulation shaft 26 is rotated through the handle 30, the conversion mechanisms 31 radially move the segments 25 with the segments 25 arranged along the circumference of the base plate 23. This changes the winding diameter of the bead ring B. As a result, through such simple manipulation, which is rotation of the handle 30, the winding diameter of the bead ring B is easily changed regardless of whether it is changed by a slight amount or a great amount.

(2) In the winding device of the first embodiment, each conversion mechanism 31 is configured by the first gear 34, the second gear 37, the threaded shaft 38, the third gear 39, and the movable member 41. The first gear 34 is supported in a manner rotational relative to the rotary shaft 22. The second gear 37 is fixed to the manipulation shaft 26 to be meshed with the first gear 34. The threaded shaft 38 is supported by the base plate 23. The third gear 39 is fixed to the threaded shaft 38 to be meshed with the first gear 34. The movable member 41 is guided by the guide portion 40, which extends in the radial direction of the base plate 23, and includes the internal threaded portion 42 threaded onto the threaded shaft 38. The movable member 41 supports the corresponding segment 25. To change the winding diameter of the bead ring B, the handle 30 is rotated to cause the conversion mechanisms 31, each of which includes the gears 34, 37, 39, to radially move the segments 25 in a state arranged along the circumference.

(3) In the winding device of the first embodiment, each movable member 41 is configured by the body 43, which is guided by the guide portion 40, and the support member 45. The support member 45 is supported by the body 43 in a manner movable in the radial direction of the base plate 23 and supports the corresponding segment 25. After the bead ring B is fully formed on the segments 25, the support members 45 are moved in the radial direction of the base plate 23 relative to the bodies 43. The segments 25 are thus separated from the inner peripheral surface of the bead ring B such that the bead ring B is easily removed.

(4) In the winding device of the first embodiment, each segment 25 is configured by the attachment portion 50, which is supported by the support member 45, and the winding portion 52, which is detachably attached to the attachment portion 50. The grooves 58 for forming the bead ring B are formed in the winding portions 52. Multiple types of winding portions 52 with grooves 58 having different cross-sectional shapes may be prepared to allow change of the cross-sectional shape of a target bead ring B by removing the winding portions 52 from the attachment portion 50 and replacing the winding portions 52.

(5) The winding device of the first embodiment is configured such that the groove width L1 of the grooves 58 is changeable. Accordingly, by adjusting the groove width L1 of the grooves 58, the winding width of a target bead ring B can be changed.

(6) In the winding device of the first embodiment, each support member 45 has the multiple support portions 46, which are extended perpendicular to the threaded shaft 38 and aligned in the radial direction of the base plate 23. Each segment 25 is supported by one of the support portions 46. Accordingly, the radial position of each segment 25 is changed by changing the position of the segment 25 to a position where the segment 25 is supported by one of the support portions 46 of the support member 45 selected to ensure a desired winding diameter. As a result, the winding diameter of the bead ring B is changed by a great amount.

(7) The winding device of the first embodiment includes the link mechanisms 61, which support the support members 45, and the locking mechanisms 67, which locks the link mechanisms 61 at the lock position P1. The device frame 21 includes the unlocking mechanisms 74, which unlock the locking mechanisms 67. Accordingly, in a normal state, the locking mechanisms 67 lock the link mechanisms 61 at the lock position P1 to retain the support members 45, which support the segment 25, not to move radially inward. This allows stable winding of the wire W on the segments 25. In contrast, after the bead ring B is fully formed, the unlocking mechanisms 74 unlock the link mechanisms 61 and the support members 45 move radially inward. This separates the segments 25 from the inner peripheral surface of the bead ring B, thus allowing easy removal of the bead ring B.

Second Embodiment

A winding device according to a second embodiment of the present invention will now be described. The differences from the first embodiment will mainly be discussed.

In the second embodiment, as illustrated in FIGS. 7 to 10, the attachment portion 50 of each segment 25 has two elongated holes 81 each extending in the axial direction of the threaded shaft 38. Screws 54 are threaded onto the support member 45 of the corresponding movable member 41 through the elongated holes 81. In this manner, the attachment portion 50 of the segment 25 is supported by the support member 45 such that the position of the attachment portion 50 is adjustable relative to the support member 45 in a radial direction of the base plate 23. A stepped portion 82, which projects forward, is formed in the inner peripheral end of the front surface of each support member 45. A spacer 83 for setting the radial position of the corresponding segment 25 is provided between the stepped portion 82 and the attachment portion 50 of the segment 25.

Figure 9:
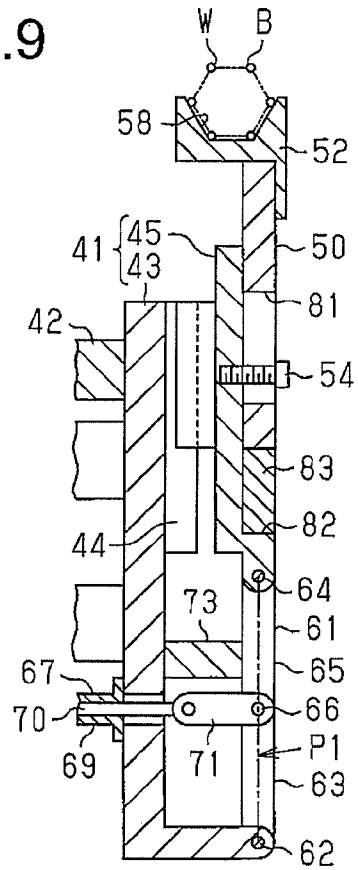
FIG. 9 is a cross-sectional view showing a portion of the winding device of FIG. 8 in a state in which the winding diameter is changed.
Figure 8:
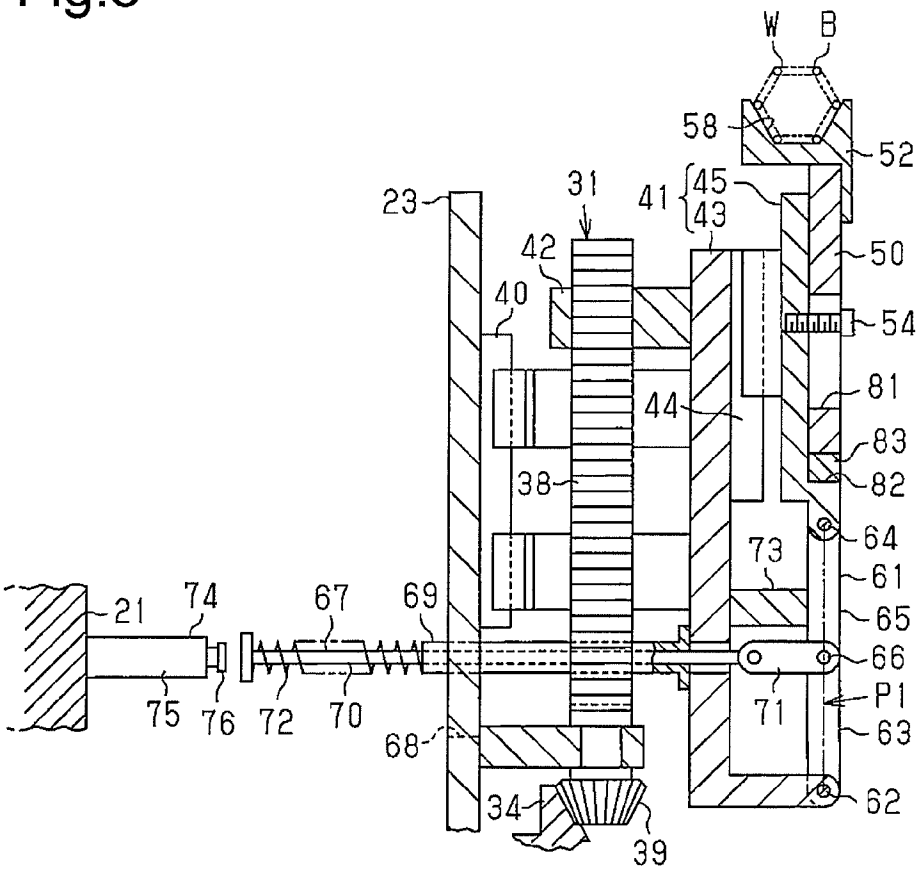
FIG. 8 is an enlarged longitudinal cross-sectional view showing a portion of the winding device of the second embodiment.

A plurality of types of spacers 83 having different thicknesses (different dimensions in a radial direction of the base plate 23) is prepared. With reference to FIGS. 8 and 9, the radial position of each segment 25 is changed by arranging a selected one of the spacers 83 between the stepped portion 82 of the corresponding support member 45 and the attachment portion 50 of the segment 25. In this manner, the winding diameter of the bead ring B, which is formed in the grooves 58 formed in the outer circumferences of the segments 25, is changed by a great amount.

Figure 10:
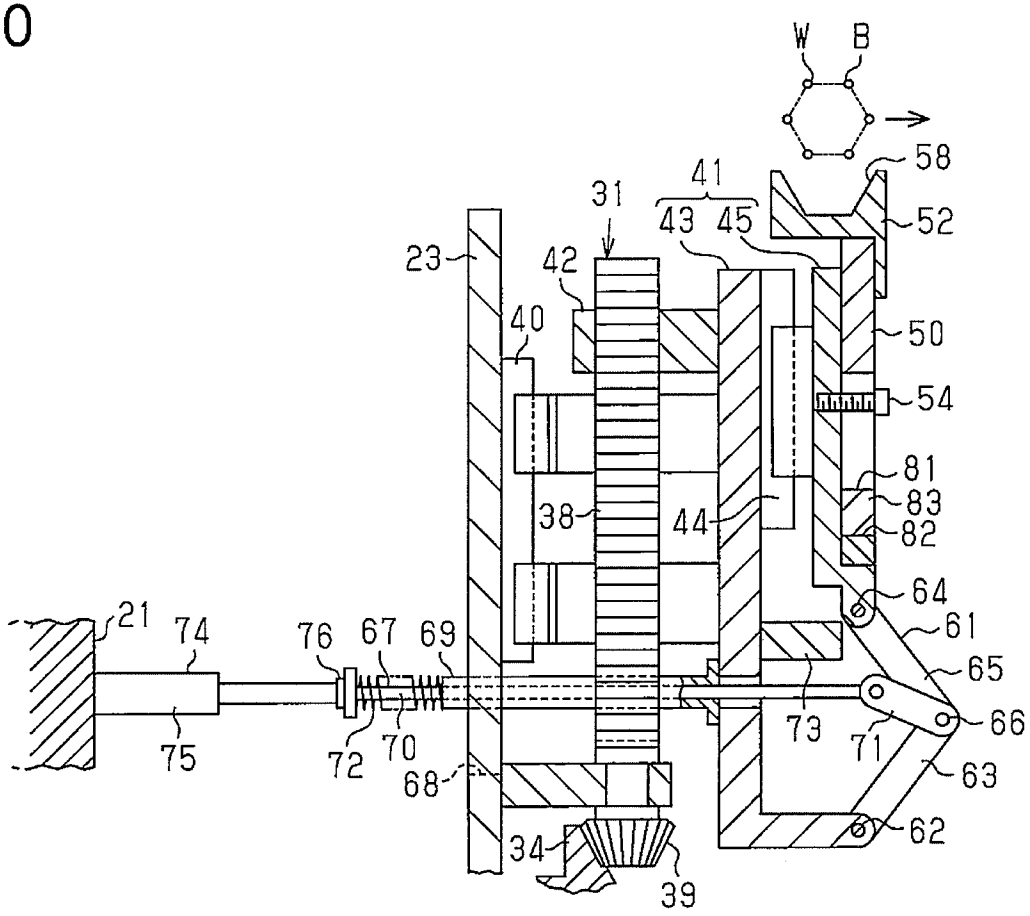
FIG. 10 is a cross-sectional view showing a portion of the winding device of FIG. 8 in an operating state.

Also in the second embodiment, the winding diameter of the bead ring B is adjusted by means of the conversion mechanisms 31 as in the first embodiment. When the manipulation shaft 26 is rotated by manipulating the handle 30, the conversion mechanisms 31, which include the gears 34, 37, 39, move the segments 25 in the radial direction of the base plate 23. The winding diameter of the bead ring B is thus easily adjusted even by a slight adjustment amount. Further, as in the first embodiment, the second embodiment includes the link mechanisms 61, the locking mechanisms 67, and the unlocking mechanisms 74. With reference to FIG. 8, each link mechanism 61 and the corresponding locking mechanism 67 lock the support member 45, which supports the segment 25, such that the support member 45 does not move radially inward. This ensures stable formation of the bead ring B on the segments 25. Referring to FIG. 10, each unlocking mechanism 74 unlocks the corresponding support member 45 such that the segment 25 moves radially inward to ensure easy removal of the bead ring B from the segments 25.

In addition to the advantages (1) to (5) and (7) of the first embodiment, the second embodiment provides the following advantage.

(8) In the second embodiment, each segment 25 is supported by the corresponding support member 45 such that the position of the segment 25 is adjustable relative to the support member 45 in the radial direction of the base plate 23. The spacer 83 is arranged between the segment 25 and the support member 45 to adjust the radial position of the segment 25. Accordingly, the radial position of the segment 25 is changed by selecting a suitable one of the multiple types of spacers 83 having different thicknesses and arranging the selected spacer 83 between the segment 25 and the support member 45. As a result, the winding diameter of the bead ring B is changed to an appropriate value.

Modifications

The illustrated embodiments may be modified as described below.

- In the first and second embodiments, each segment 25 has a shape corresponding to one of the shapes obtained by dividing an annular body that can be arranged coaxially with the base plate in the vicinity of the outer circumference of the base plate 23 into four sections. However, the segment 25 may have a shape corresponding to one of the shapes obtained by dividing the annular body into two, three, five, or more sections.
- The configuration including the multiple support portions 46, which are engageable with the segments 25 to change the winding diameter discretely, may be omitted.
- In the first and second embodiments, when the position of each segment 25 is changed in the radial direction of the base plate 23 by a great amount, for example, the support position of the segment 25 is switched from the position corresponding to the support portion 46 adjacent to the second support pin 64 to the position corresponding to the support portion 46 in the vicinity of the outer end of the support member 45, the segment 25 may have to be replaced by a segment 25 having a winding portion 52 with a different radius of curvature. To satisfy such need, a plurality of types of segments 25 with winding portions 52 having different radii of curvature may be prepared and replaced when necessary. In contrast, if the change amount of the position of each segment 25 is not significantly great, for example, the segment 25 is switched from engagement with a certain one of the support portions 46 to engagement with an adjacent one of the support portions 46 in the support member 45, replacement of the segments 25 is unnecessary.

DESCRIPTION OF THE REFERENCE NUMERALS

21 . . . device frame, 22 . . . rotary shaft, 23 . . . base plate, 25 . . . segment, 26 . . . manipulation shaft, 28 . . . handle shaft, 30 . . . handle, 31 . . . conversion mechanism, 34 . . . first gear, 37 . . . second gear, 38, threaded shaft, 39 . . . third gear, 40 . . . guide portion, 41 . . . movable member, 42 . . . internal threaded portion, 43 . . . body, 45 . . . support member, 46 . . . support portion, 50 . . . attachment portion,

52 . . . winding portion, 53 . . . engagement portion, 55 . . . body portion, 56 . . . adjustment portion, 58 . . . groove, 61 . . . link mechanism, 63 . . . first link, 65 . . . second link, 66 . . . joint pin, 67 . . . locking mechanism, 70 . . . rod, 71 . . . lock lever, 72 . . . spring, 73 . . . stopper, 74 . . . unlocking mechanism, 75 . . . cylinder, 83 . . . spacer, W . . . wire, B . . . bead ring, L1 . . . groove width, P1 . . . lock position.

The invention claimed is:

1. A device for winding a wire to form a bead ring, the device comprising:

(i) a base plate that is rotated by a rotary shaft;

(ii) a plurality of segments arranged in an annular zone corresponding to an outer circumference of the base plate, each of the segments having a shape corresponding to one of the shapes obtained by dividing the annular zone into a plurality of sections along a circumference of the base plate, wherein the segments are each supported by the base plate each in a manner movable in a radial direction of the base plate;

(iii) a manipulation shaft that is rotated by a handle; and (iv) a conversion mechanism arranged between the manipulation shaft and each segment, the conversion mechanism including a first gear supported by the base plate in a manner rotational relative to the rotary shaft, a second gear fixed to the manipulation shaft to be meshed with the first gear, a plurality of threaded shafts supported by the base plate, a plurality of third gears fixed to the threaded shafts to be meshed with the first gear, and a plurality of movable members that are guided by a plurality of guide portions, which are formed on the base plate to extend in the radial direction of the base plate, each of the [guide portions] *moveable members* including an internal threaded portion threaded onto the corresponding threaded shaft, wherein the segments are each supported by one of the movable members; each of the movable members includes a body that is guided by the corresponding guide portion and a support member supported by the body in a manner movable in the radial direction of the base plate, wherein the support member supports the corresponding segment; each segment includes an attachment portion supported by the corresponding support member, a winding portion detachably attached to the attachment portion, and a groove for winding the wire formed in the winding portion; and each support member includes a plurality of groove-shaped support portions arranged in the radial direction of the base plate, each segment being supported by one of the support portions; the attachment portion, when selectively engaged to one of the plurality of support portions, defining a diameter of the bead ring to be formed, the diameter capable of a first adjustment through engagement of the attachment portion with another one of the plurality of support portions;

whereby, the conversion mechanism converts rotation of the manipulation shaft to movement of the corresponding segment in the radial direction of the base plate, thereby allowing a second adjustment of the diameter of the bead ring; and during operation, when the base plate rotates, a wire is wound on an outer circumference of the segments, which rotate integrally with the base plate, thereby forming a bead ring.

2. The winding device according to claim 1, wherein each of the winding portions is configured such that a width of the groove is changeable.

3. The winding device according to claim 1, further comprising:

a plurality of link mechanisms each of which supports one of the support members;

a plurality of locking mechanisms each of which locks one of the link mechanisms at a lock position; and a plurality of unlocking mechanisms each of which cancels locking by one of the locking mechanisms.

* * * * *